(12) United States Patent  (10) Patent No.: US 7,674,569 B2
Yano et al.  (45) Date of Patent: Mar. 9, 2010

(54) OPTICAL RECORDING MATERIAL AND OPTICAL RECORDING MEDIUM

(75) Inventors: Toru Yano, Tokyo (JP); Koichi Shigeno, Tokyo (JP)

(73) Assignee: Adeka Corporation, Tokyo (JP)

( * ) Notice: Subject to any disclaimer, the term of this patent is extended or adjusted under 35 U.S.C. 154(b) by 206 days.

(21) Appl. No.: 11/632,643

(22) PCT Filed: Jun. 7, 2005

(86) PCT No.: PCT/JP2005/010391

§ 371 (c)(1),
(2), (4) Date: Jan. 16, 2007

(87) PCT Pub. No.: WO2006/011306

PCT Pub. Date: Feb. 2, 2006

(65) Prior Publication Data

US 2008/0033179 A1    Feb. 7, 2008

(30) Foreign Application Priority Data

Jul. 29, 2004    (JP) .............................. 2004-222239

(51) Int. Cl.
*G11B 7/24* (2006.01)

(52) U.S. Cl. .............................. 430/270.21; 430/270.2; 430/945; 369/284; 428/64.8

(58) Field of Classification Search ........................ None
See application file for complete search history.

(56) References Cited

U.S. PATENT DOCUMENTS

| | | | |
|---|---|---|---|
| 3,782,957 A | | 1/1974 | Ohkubo et al. |
| 4,735,839 A | * | 4/1988 | Sato et al. .................. 428/64.7 |
| 4,889,410 A | * | 12/1989 | Elwood ...................... 359/891 |
| 6,063,467 A | * | 5/2000 | Kanno ....................... 428/64.1 |
| 7,425,401 B2 | * | 9/2008 | Yano et al. .............. 430/270.21 |

(Continued)

FOREIGN PATENT DOCUMENTS

GB    1350230    *    4/1974

(Continued)

OTHER PUBLICATIONS

European Patent Office issued a European Search Report dated Jul. 10, 2009, Application No. 05749072.4.

*Primary Examiner*—Martin J Angebranndt
(74) *Attorney, Agent, or Firm*—Young & Thompson

(57) ABSTRACT

An optical recording material for use in an optical recording layer of an optical recording medium comprising the optical recording layer provided on a substrate,
the optical recording material comprising a cyanine compound represented by general formula (I):

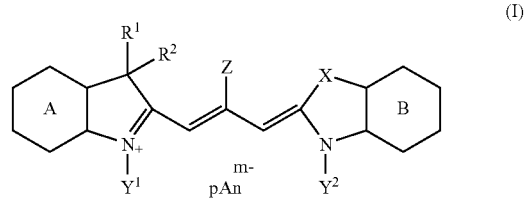

wherein rings A and B each represent a substituted or unsubstituted benzene or naphthalene ring; X represents O, S, Se, $CR^3R^4$ or NY; one of $R^1$ and $R^2$ represents a specific group of formula (II) or (III), with the other representing a C1 to C30 organic group; $R^3$ and $R^4$ each represent a C1 to C30 organic group; Y, $Y^1$, and $Y^2$ each represent a hydrogen atom or a C1 to C30 organic group; Z represents a hydrogen atom, a halogen atom or a cyano group; $An^{m-}$ represents an m-valent anion; m represents an integer of 1 or 2; and p represents a coefficient maintaining charge neutrality.

10 Claims, 4 Drawing Sheets

U.S. PATENT DOCUMENTS

| | | | |
|---|---|---|---|
| 2003/0224293 A1* | 12/2003 | Oya et al. | 430/270.14 |
| 2005/0031993 A1* | 2/2005 | Yano et al. | 430/270.21 |
| 2006/0286483 A1* | 12/2006 | Yano et al. | 430/270.21 |
| 2007/0259294 A1* | 11/2007 | Shigeno et al. | 430/495.1 |
| 2008/0207918 A1* | 8/2008 | Aoyama et al. | 548/455 |
| 2009/0054652 A1* | 2/2009 | Yano et al. | 546/152 |

FOREIGN PATENT DOCUMENTS

| | | | |
|---|---|---|---|
| JP | 2-124501 | | 5/1990 |
| JP | 05-173282 | * | 7/1993 |
| JP | 2002-52829 | | 2/2002 |
| JP | 2002-293844 | * | 10/2002 |
| JP | 2003-231359 | * | 8/2003 |
| JP | 2003-335061 | | 11/2003 |
| JP | 2004-53799 | | 2/2004 |
| JP | 2005-53875 | | 3/2005 |
| JP | 2005-132055 | | 5/2005 |
| WO | 2005/014722 | | 2/2005 |

* cited by examiner

OPTICAL RECORDING MATERIAL AND OPTICAL RECORDING MEDIUM

TECHNICAL FIELD

This invention relates to an optical recording material containing a specific cyanine compound and an optical recording medium having a thin film of the optical recording material as an optical recording layer.

BACKGROUND ART

Compounds having a large absorption in a range of from 550 to 620 nm, particularly those having a maximum absorption ($\lambda_{max}$) in a range of from 550 to 620 nm are used as an optical recording material forming an optical recording layer of optical recording media, such as DVD-Rs.

There have been many reports on cyanine compounds having an indole ring because of their high sensitivity and capability of coping with increasing recording speeds in the above-described applications as an optical recording material. For example, cyanine compounds having a specific organic group introduced at the 3-position of the indole ring to cope with high-speed recording are reported in Patent Document 1 and Patent Document 2. Patent Document 1 discloses a cyanine compound having spiroalkane at the 3-position, and Patent Document 2 discloses a cyanine compound with benzyl at the 3-position.

Optical recording media have ever been required to achieve further increase in recording speed, and optical recording materials are also required to exhibit performance in response to such requirement Patent Document 1: JP 2002-52829A Patent Document 2: JP 2003-231359A

DISCLOSURE OF THE INVENTION

Problems to be Solved by the Invention

An object of the present invention is to provide an optical recording material and medium exhibiting performance adequate for high-speed optical recording applications.

Means for Solving the Problems

As a result of extensive investigations, the present inventors have found that a cyanine compound having a group containing a multiple bond incorporated at a specific position thereof is suitable for use as an optical recording material.

The present invention has been completed based on the above finding. The invention provides an optical recording material for use in an optical recording layer of an optical recording medium comprising the optical recording layer provided on a substrate, the optical recording material comprising a cyanine compound represented by general formula (I) shown below. The invention also provides an optical recording medium having a substrate and a thin film formed of the optical recording material.

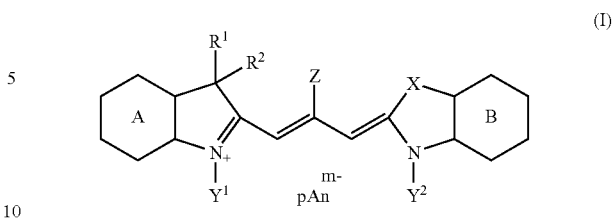

wherein ring A and ring B each represent a benzene ring optionally having a substituent or a naphthalene ring optionally having a substituent; X represents O, S, Se, $CR^3R^4$ or NY; one of $R^1$ and $R^2$ represents a group represented by general formula (II) or (III) shown below, with the other representing an organic group having 1 to 30 carbon atoms; $R^3$ and $R^4$ each represent an organic group having 1 to 30 carbon atoms; Y, $Y^1$, and $Y^2$ each represent a hydrogen atom or an organic group having 1 to 30 carbon atoms; Z represents a hydrogen atom, a halogen atom or a cyano group; $An^{m-}$ represents an m-valent anion; m represents an integer of 1 or 2; and p represents a coefficient maintaining charge neutrality.

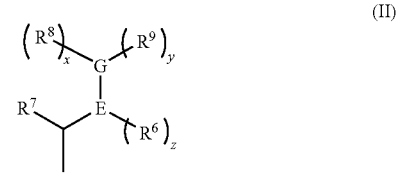

wherein the bond between E and G is a double bond or a triple bond; E represents a carbon atom; G represents a carbon atom, an oxygen atom or a nitrogen atom; x, y, and z each independently represent 0 or 1; $R^5$ represents a hydrogen atom, a halogen atom, an alkyl group having 1 to 4 carbon atoms and optionally substituted with a halogen atom or an alkoxy group having 1 to 4 carbon atoms and optionally substituted with a halogen atom; $R^6$, $R^7$, and $R^8$ each independently represent a hydrogen atom, a halogen atom or an alkyl group having 1 to 4 carbon atoms and optionally substituted with a halogen atom; $R^6$ and $R^8$ may be connected to each other to form a cyclic structure.

wherein the bond between E' and G' is a double bond; E' represents a carbon atom; G' represents a carbon atom, an oxygen atom or a nitrogen atom; the ring containing E' and G' is a 5-membered ring optionally containing a hetero atom, a heterocyclic 6-membered ring, a naphthalene ring, a quinoline ring, an isoquinoline ring, an anthracene ring or an anthraquinone ring; the ring containing E' and G' may be substituted with at least one substituent selected from the group consisting of a halogen atom, a nitro group, a cyano group, an alkyl group, and an alkoxy group.

BEST MODE FOR CARRYING OUT THE INVENTION

Figure 1:
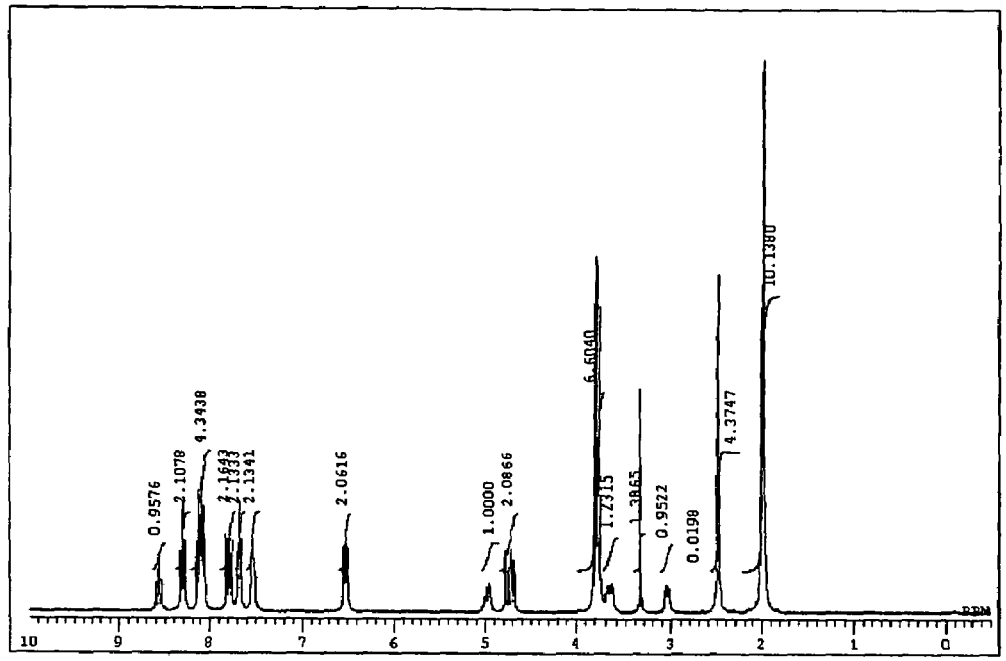
FIG. 1 shows a $^1$H-NMR spectrum of the optical recording material obtained in Example 1 (hexafluorophosphate of compound No. 4).
Figure 2:
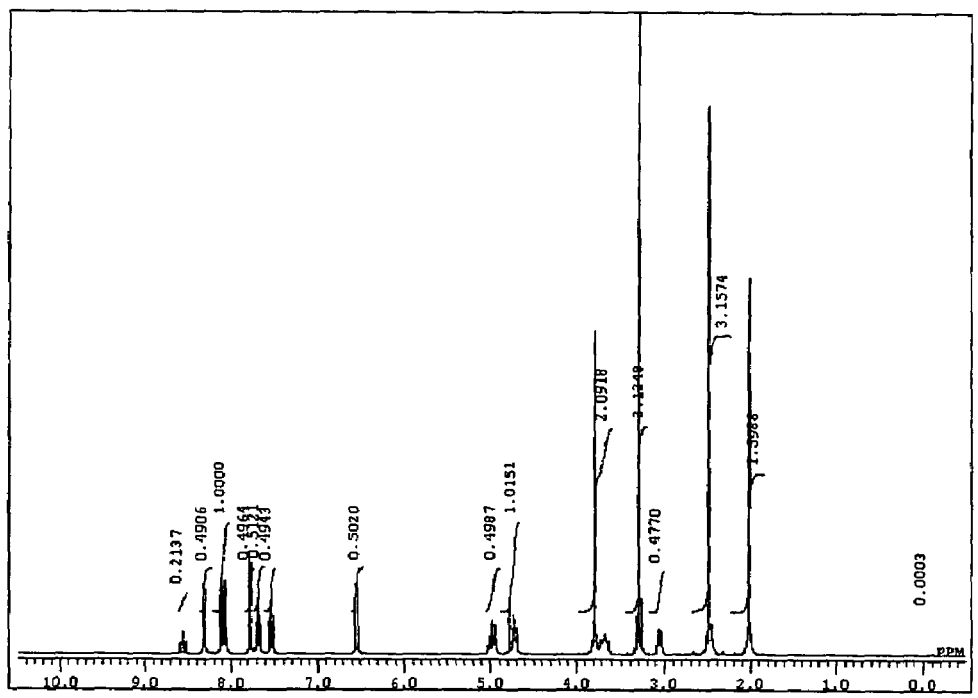
FIG. 2 shows a $^1$H-NMR spectrum of the optical recording material obtained in Example 2 (hexafluorophosphate of compound No. 5).
Figure 3:
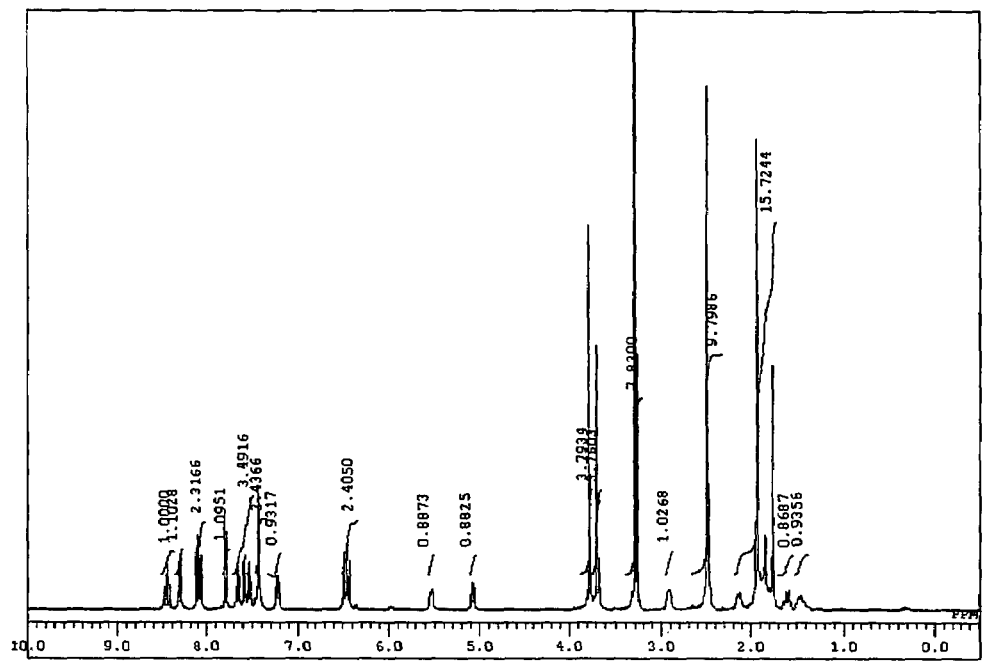
FIG. 3 shows a $^1$H-NMR spectrum of the optical recording material obtained in Example 3 (hexafluorophosphate of compound No. 14).
Figure 4:
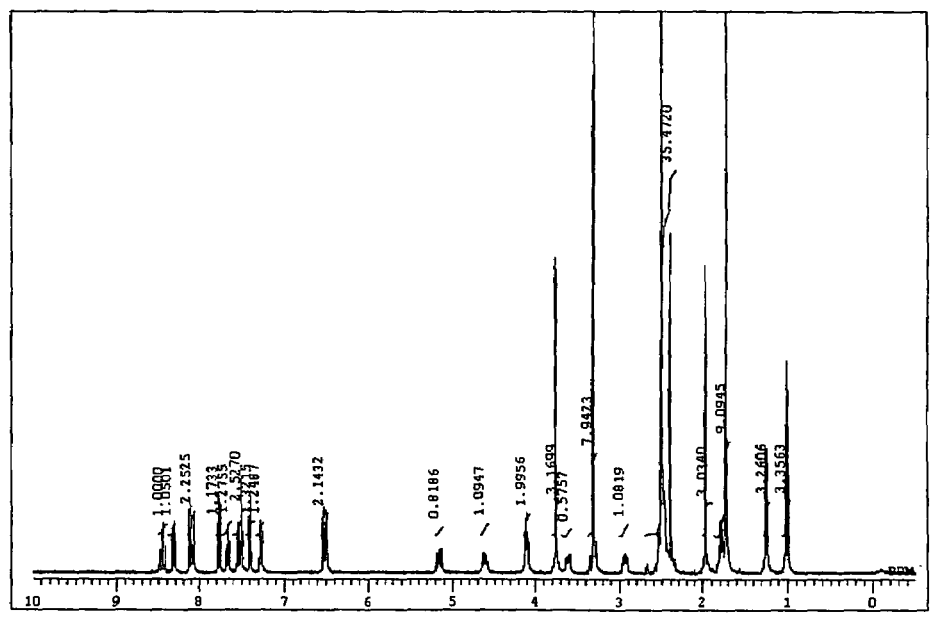
FIG. 4 shows a $^1$H-NMR spectrum of the optical recording material obtained in Example 4 (hexafluorophosphate of compound No. 19).
Figure 5:
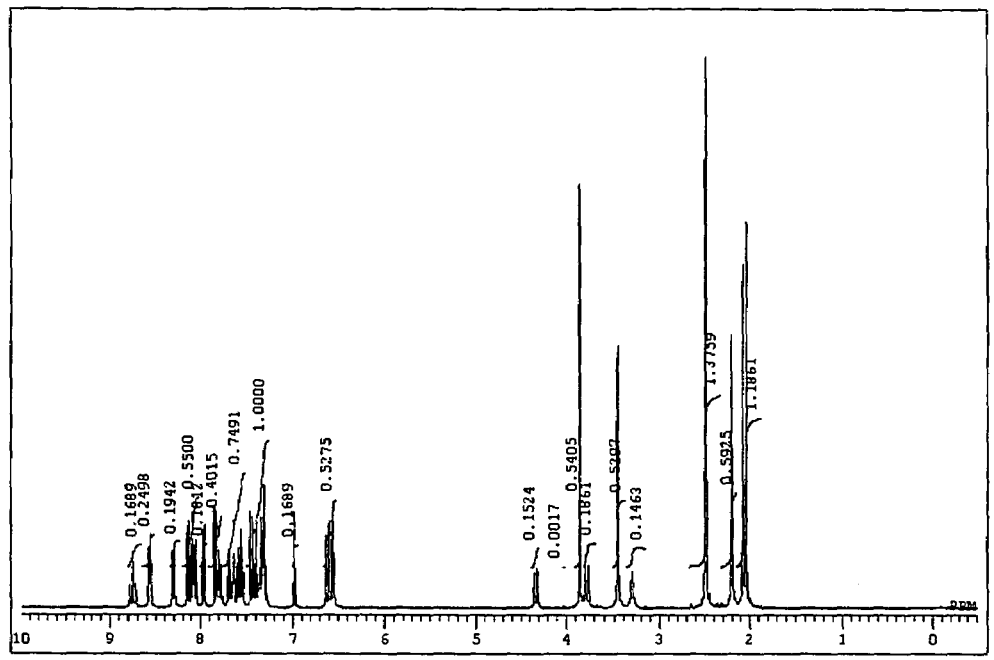
FIG. 5 shows a $^1$H-NMR spectrum of the optical recording material obtained in Example 5 (hexafluorophosphate of compound No. 40).
Figure 6:
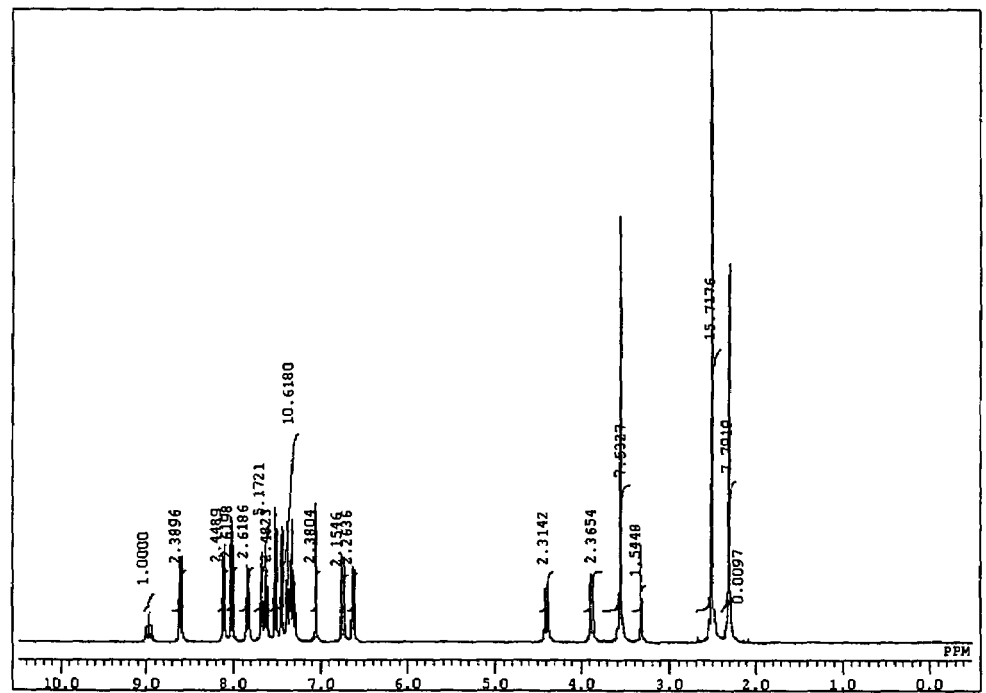
FIG. 6 shows a $^1$H-NMR spectrum of the optical recording material obtained in Example 6 (hexafluorophosphate of compound No. 41).
Figure 7:
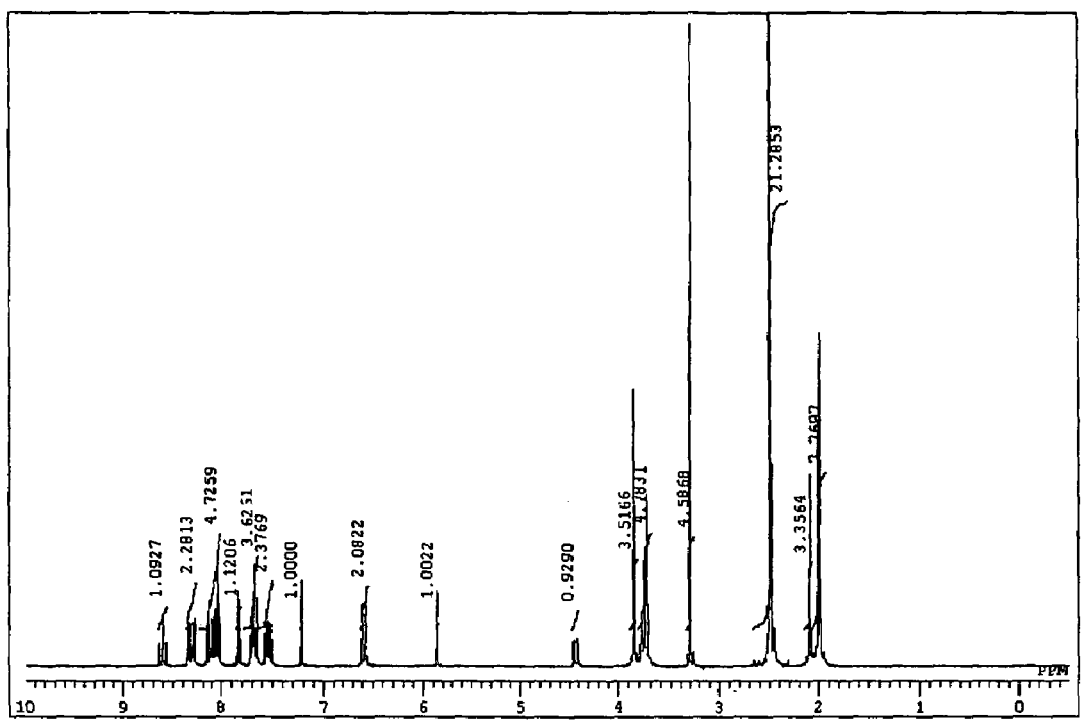
FIG. 7 shows a $^1$H-NMR spectrum of the optical recording material obtained in Example 7 (hexafluorophosphate of compound No. 48).

The cyanine compound of the invention represented by general formula (I) is a compound characterized by having a specific structure group at the 3-position of the indole skeleton. The compound is characterized by its higher ability to respond to high speed recording than conventional cyanine compounds used in optical recording materials for DVD-R application.

In general formula (I), examples of the substituent of the substituted benzene or naphthalene ring represented by rings A and B include a halogen atom such as fluorine, chlorine, bromine or iodine; an alkyl group which may be substituted with a halogen atom, such as methyl, ethyl, propyl, isopropyl, butyl, sec-butyl, tert-butyl isobutyl, amyl, isoamyl, tert-amyl, hexyl, cyclohexyl, heptyl, isoheptyl, tert-heptyl, n-octyl, isooctyl, tert-octyl, 2-ethylhexyl or trifluoromethyl; an aryl group, such as phenyl, naphthyl, 2-methylphenyl, 3-methylphenyl, 4-methylphenyl, 4-vinylphenyl or 3-isopropylphenyl; an alkoxy group which may be substituted with a halogen atom, such as methoxy, ethoxy, propoxy, isopropoxy, butoxy, sec-butoxy, tert-butoxy or trifluoromethoxy, an alkylthio group, such as methylthio, ethylthio, propylthio, isopropylthio, butylthio, sec-butylthio, tert-butylthio or trifluoromethylthio; a nitro group; and a cyano group.

The organic groups having 1 to 30 carbon atoms as represented by $R^1$, $R^2$, $R^3$, $R^4$, Y, $Y^1$ or $Y^2$ include, but are not limited to, an alkyl group, e.g., methyl, ethyl, propyl, isopropyl butyl, sec-butyl, tert-butyl, isobutyl, amyl, isoamyl tert-amyl, hexyl, cyclohexyl, cyclohexylmethyl, 2-cyclohexylethyl, heptyl, isoheptyl, t-heptyl, n-octyl, isooctyl t-octyl, 2-ethylhexyl, nonyl, isononyl, decyl, dodecyl, tridecyl, tetradecyl, pentadecyl, hexadecyl, heptadecyl or octadecyl; an alkenyl group, e.g., vinyl 1-propenyl (2-methylethenyl), 2-propenyl (allyl), isopropenyl (1-methylethenyl), butenyl (e.g., 1-butenyl, 2-butenyl, 3-butenyl or isobutenyl), pentenyl, hexenyl, heptenyl octenyl, decenyl, pentadecenyl or 1-phenylpropen-3-yl; phenyl, naphthyl; an alkylaryl group, e.g., 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-t-butylphenyl, 4-hexylphenyl, 4-cyclohexylphenyl, 4-ylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-t-butylphenyl or cyclohexylphenyl; and an arylalkyl group, e.g., benzyl, phenethyl, 2-phenylpropan-2-yl, diphenylmethyl triphenylmethyl, styryl or cinnamyl. Further included are the above-recited hydrocarbon groups which are interrupted by an ether linkage and/or a thioether linkage, such as 2-methoxyethyl, 3-methoxypropyl, 4-methoxybutyl, 2-butoxyethyl, methoxyethoxyethyl, methoxyethoxyethoxyethyl, 3-methoxybutyl, 2-phenoxyethyl, 2-methylthioethyl, and 2-phenylthioethyl. These organic groups may further be substituted with an alkoxy group, an alkenyl group, a nitro group, a cyano group, a halogen atom, etc.

When $R^1$, $R^2$, $R^3$ or $R^4$ is a C1 to C30 organic group other than the groups of general formulae (II) and (III), if the organic group is bulky, such a bulky substituent reduces the molar absorptivity of the cyanine compound and can affect the sensitivity. Moreover, steric hindrance can occur to markedly reduce the efficiency of producing the cyanine compound. Accordingly, it is preferred that $R^1$ to $R^4$ each represent any of the following groups.

Alkyl groups, particularly those having 1 to 4 carbon atoms, such as methyl, ethyl, propyl, isopropyl, butyl, sec-butyl, tert-butyl, and isobutyl.

Substituted or unsubstituted benzyl groups, the substituents including a hydroxyl group; a halogen atom, e.g., fluorine, chlorine, bromine or iodine; a cyano group; a nitro group; an alkyl group with 1 to 4 carbon atoms, e.g., methyl, ethyl, propyl, isopropyl, butyl, sec-butyl, tert-butyl or isobutyl; a halogen-substituted alkyl group with 1 to 4 carbon atoms, e.g., chloromethyl, dichloromethyl, trichloromethyl, bromomethyl, dibromomethyl, tribromomethyl, fluoromethyl, difluoromethyl, trifluoromethyl, 2,2,2-trifluoroethyl, perfluoroethyl, perfluoropropyl or perfluorobutyl; an alkoxy group with 1 to 4 carbon atoms, e.g., methoxy, ethoxy, propoxy, isopropoxy, butoxy, sec-butoxy or tert-butoxy; and a halogen-substituted alkoxy group, e.g., chloromethoxy, dichloromethoxy, trichloromethoxy, bromomethoxy, dibromomethoxy, tribromomethoxy, fluoromethoxy, difluoromethoxy, trifluoromethoxy, 2,2,2-trifluoroethoxy, perfluoroethoxy, perfluoropropoxy or perfluorobutoxy.

It is also preferred that $R^3$ and $R^4$ are taken together to represent a group forming a 3- to 6-membered ring. Examples of the group forming a 3- to 6-membered ring include cyclopropane-1,1-diyl, cyclobutane-1,1-diyl, 2,4-dimethylcyclobutane-1,1-diyl, 3-dimethylcyclobutane-1,1-diyl cyclopentane-1,1-diyl, cyclohexane-1,1-diyl, tetrahydropyran-4,4-diyl, thiane-4,4-diyl, piperidine-4,4-diyl, N-substituted piperidine-4,4-diyl, morpholine-2,2-diyl, morpholine-3,3-diyl, N-substituted morpholine-2,2-diyl, and N-substituted morpholine-3,3-diyl, in which the N-substituent may be selected from the substituents that may be present on rings A and B.

When Y, $Y^1$, and $Y^2$ in general formula (I) are bulky, such bulky substituents reduce the molar absorptivity of the cyanine compound and can affect the sensitivity. Therefore, hydrocarbon groups having 1 to 8 carbon atoms, particularly alkyl groups having 1 to 8 carbon atoms are preferred.

Examples of the halogen atom as represented by Z in general formula (I) include fluorine, chlorine, bromine, and iodine.

Of the anions represented by $An^{m-}$ in general formula (I), monovalent ones include halide anions, e.g., chloride, bromide, iodide and fluoride anions; inorganic anions, such as perchlorate, chlorate, thiocyanate, hexafluorophosphate, hexafluoroantimonate, and tetrafluoroborate anions; organic sulfonate anions, such as benzenesulfonate, toluenesulfonate, trifluoromethanesulfonate, diphenylamine-4-sulfonate, 2-amino-4-methyl-5-chlorobenzenesulfonate, and 2-amino-5-nitrobenzenesulfonate anions; and organophosphate anions, such as octylphosphate, dodecylphosphate, octadecylphosphate, phenylphosphate, nonylphenylphosphate, and 2,2'-methylenebis(4,6-di-tert-butylphenyl)phosphonate anions. Divalent ones include benzenedisulfonate and naphthalenedisulfonate anions. If desired, a quencher anion capable of deexcitation (quenching) an active molecule in an excited state, a metallocene compound anion of for example, a ferrocene or ruthenocene compound having an anionic group (e.g., carboxyl, phosphonic or sulfonic group) on the cyclopentadienyl ring, and the like can be used.

Examples of the quencher anion include anions represented by general formulae (A) and (B) shown below and those described in JP 60-234892A, JP 5-43814A, JP 6-239028A, JP 9-309886A, and JP 10-45767A.

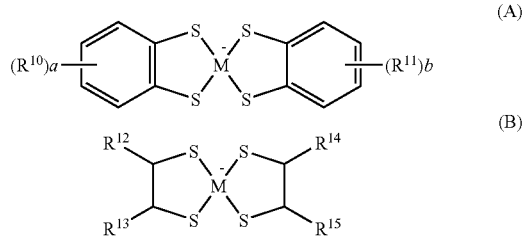

wherein M represents a nickel atom or a copper atom; $R^{10}$ and $R^{11}$ each represent a halogen atom, an alkyl group having 1 to 8 carbon atoms, an aryl group having 6 to 30 carbon atoms or —$SO_2$—Z; Z represents an alkyl group, an aryl group, a halogen-substituted aryl group, a dialkylamino group, a diarylamino group, a piperidino group or a morpholino group; a and b each represent an integer of 0 to 4; and $R^{12}$, $R^{13}$, $R^{14}$, and $R^{15}$ each independently represent an alkyl group, an alkylphenyl group, an alkoxyphenyl group or a halogen-substituted phenyl group.

In general formula (II), examples of the halogen atom represented by $R^5$, $R^6$, $R^7$ or $R^8$ are fluorine, chlorine, bromine, and iodine. Examples of the C1 to C4 alkyl group that may be substituted with a halogen atom include methyl ethyl, propyl, isopropyl, butyl, sec-butyl, tert-butyl, isobutyl, chloromethyl, dichloromethyl, trichloromethyl, bromomethyl, dibromomethyl, tribromomethyl, fluoromethyl difluoromethyl, trifluoromethyl, 2,2,2-trifluoroethyl, perfluoroethyl, perfluoropropyl, and perfluorobutyl. Examples of the C1 to C4 alkoxy group that may be substituted with a halogen atom include methoxy, ethoxy, propoxy, isopropoxy, butoxy, sec-butoxy, tert-butoxy, and trifluoromethoxy. Examples of the cyclic structure formed by connecting $R^6$ and $R^8$ include cyclobutene, cyclopentene, cyclohexene, pyrrole, dihydropyrrole, and pyridine rings.

In general formula (III), examples of the 5-membered ring containing E' and G' and optionally containing a hetero atom include cyclopentene, cyclopentadiene, pyrrole, imidazole, pyrazole, triazole, thiophene, furan, thiazole, isothiazole, oxazole, isoxazole, dihydropyrrole, dihydroimidazole, dihydropyrazole, triazole, dihydrothiophene, dihydrofuran, dihydrothiazole, dihydroisothiazole, dihydrooxazole, and dihydroisoxazole rings. Examples of the heterocyclic 6-membered ring containing E' and G' include pyridine, pyrazine, pyrimidine, pyridazine, pyran, and thiopyran rings. The rings containing E' and G' may be substituted with a halogen atom, e.g., fluorine, chlorine, bromine or iodine; a nitro group; a cyano group; an alkyl group, e.g., methyl, ethyl, propyl, isopropyl, butyl, isobutyl, tert-butyl or trifluoromethyl; or an alkoxy group, e.g., methoxy, ethoxy, propoxy, isopropoxy, butoxy, sec-butoxy, tert-butoxy or trifluoromethoxy.

Specific examples of the cyanine compound represented by general formula (I) according to the present invention include compound Nos. 1 through 72 below. The formulae shown are cation moieties of the cyanine compounds.

Compound No. 1

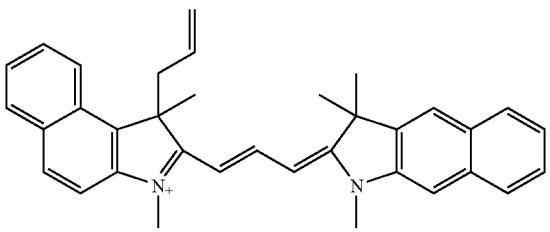

Compound No. 2

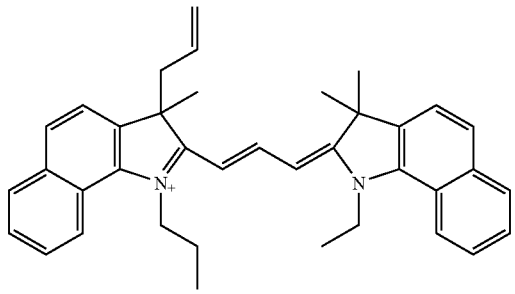

Compound No. 3

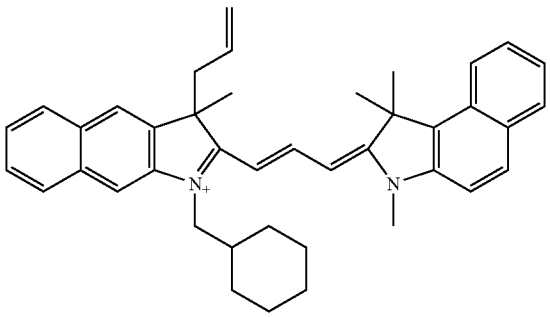

Compound No. 4

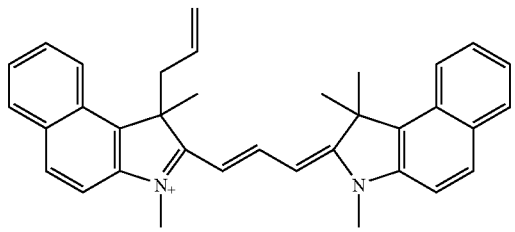

-continued
Compound No. 5
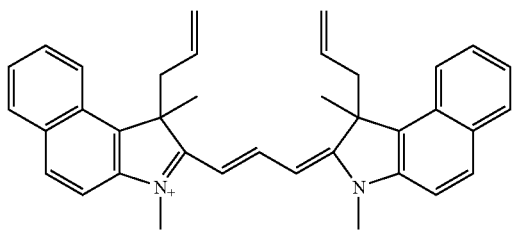
Compound No. 6
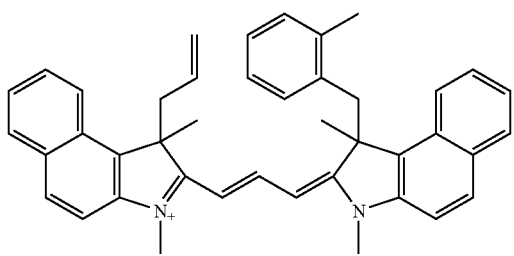
Compound No. 7
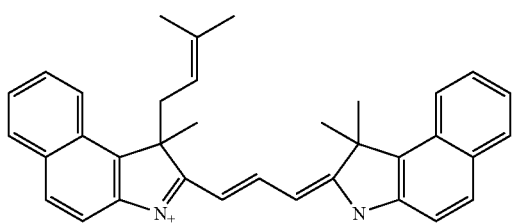
Compound No. 8
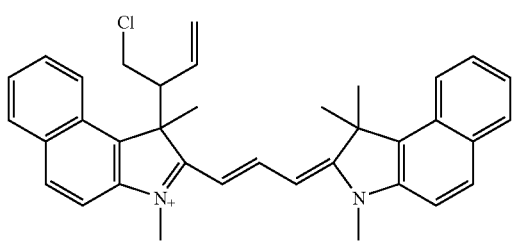
Compound No. 9
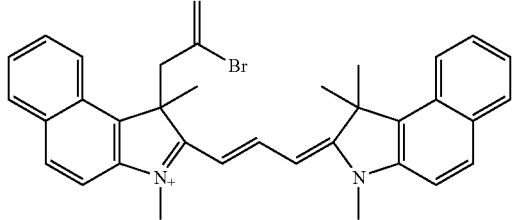
Compound No. 10
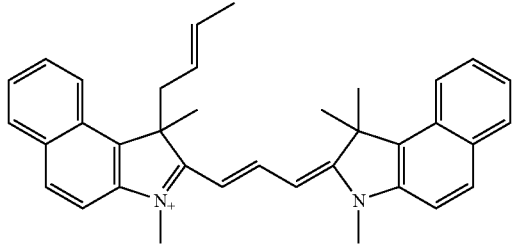
-continued
Compound No. 11
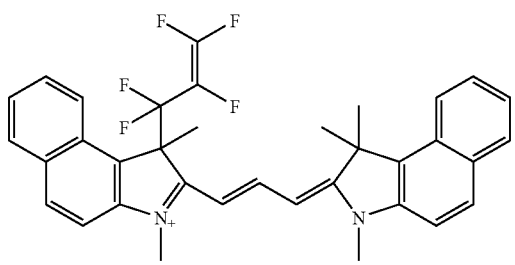
Compound No. 12
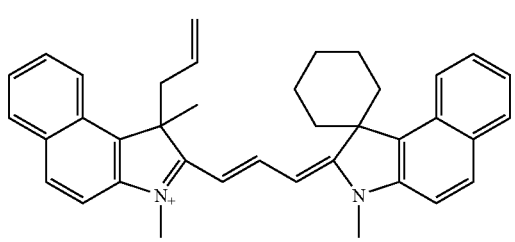
Compound No. 13
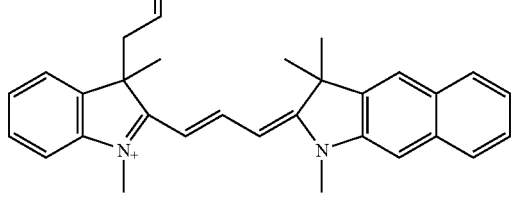
Compound No. 14
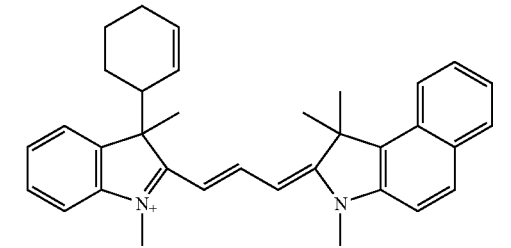
Compound No. 15
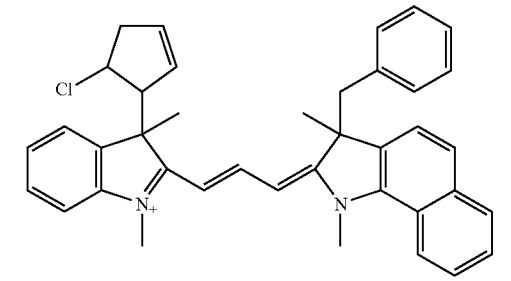

-continued
Compound No. 16
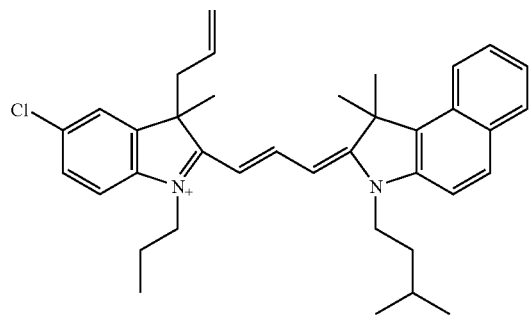
Compound No. 17
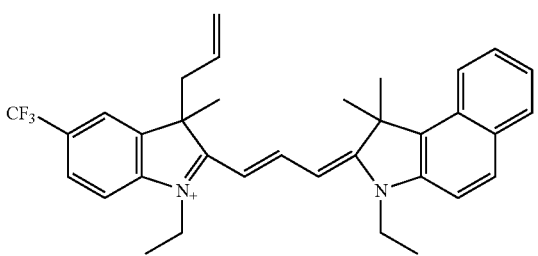
Compound No. 18
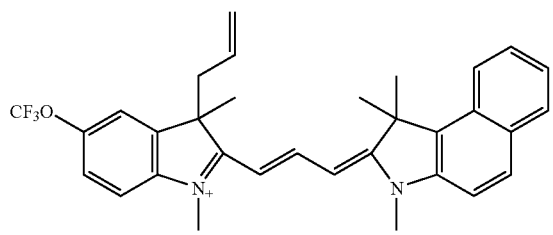
Compound No. 19
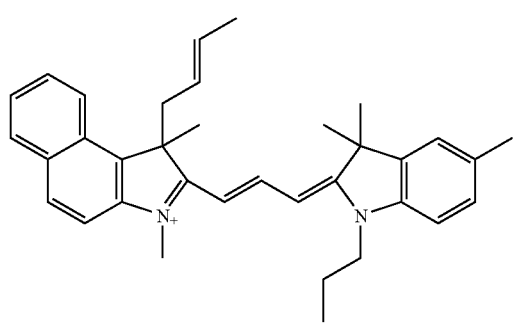
Compound No. 20
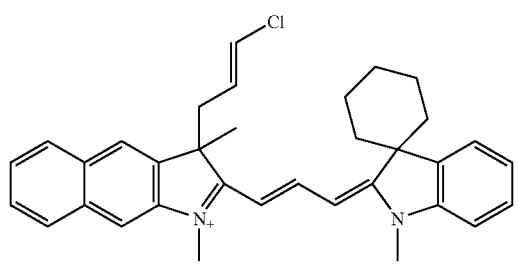
-continued
Compound No. 21
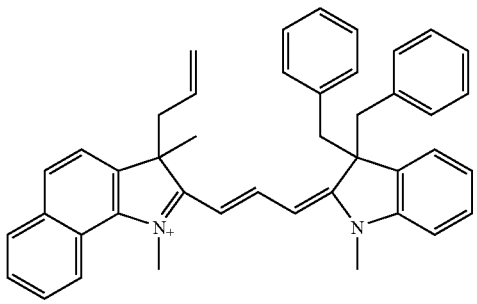
Compound No. 22
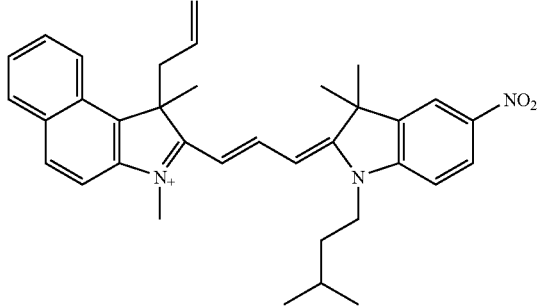
Compound No. 23
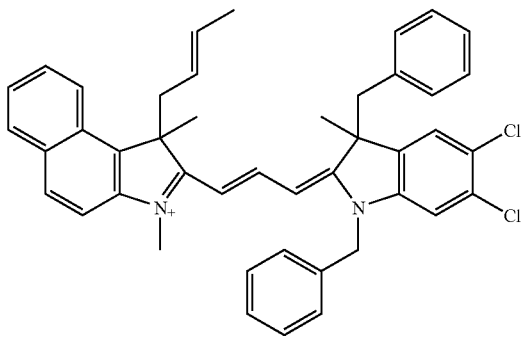
Compound No. 24
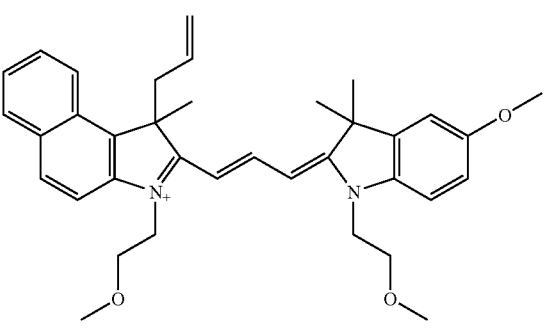
Compound No. 25
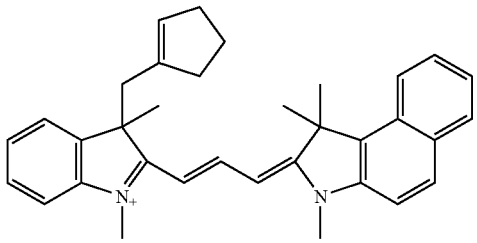

-continued
Compound No. 26
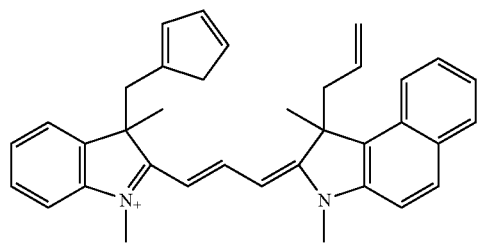
Compound No. 27
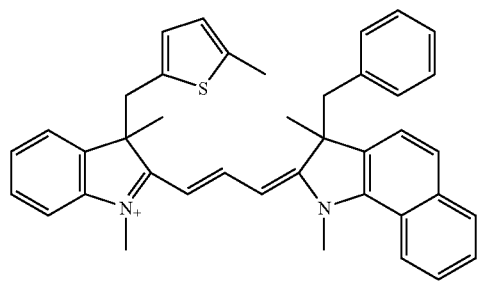
Compound No. 28
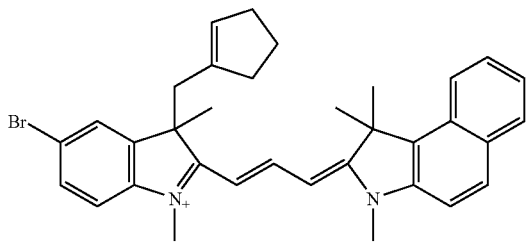
Compound No. 29
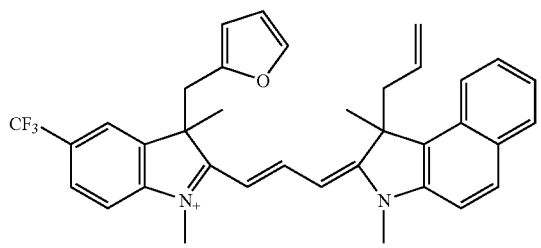
Compound No. 30
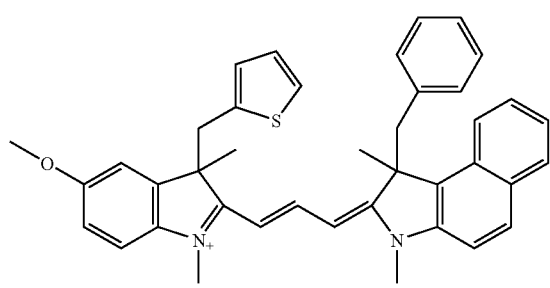
-continued
Compound No. 31
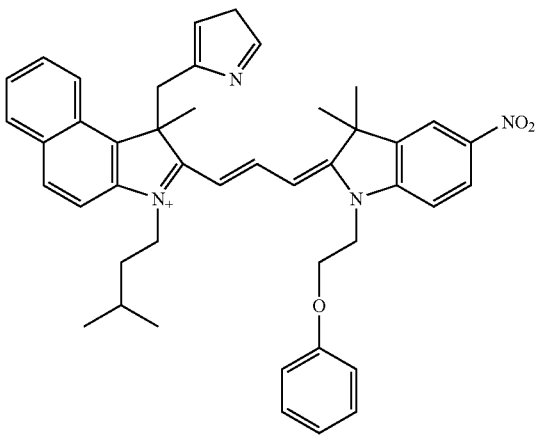
Compound No. 32
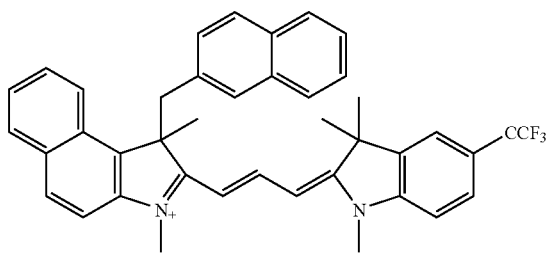
Compound No. 33
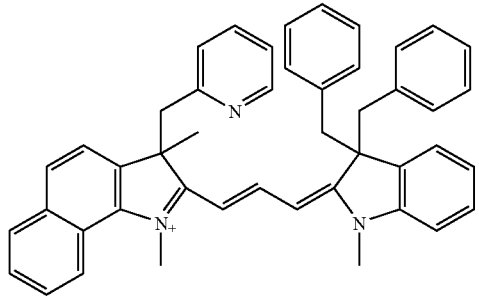
Compound No. 34
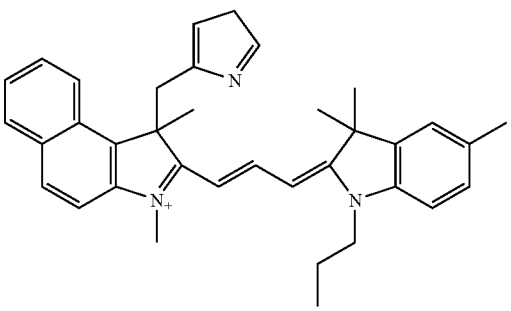

-continued
Compound No. 35
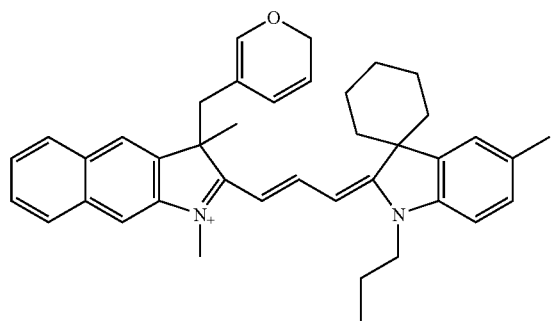
Compound No. 36
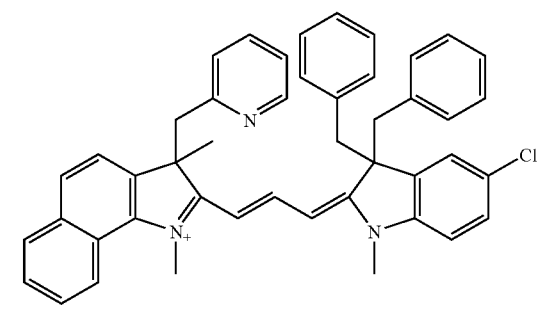
Compound No. 37
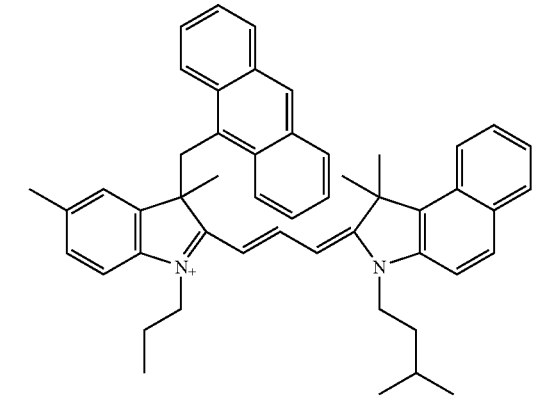
Compound No. 38
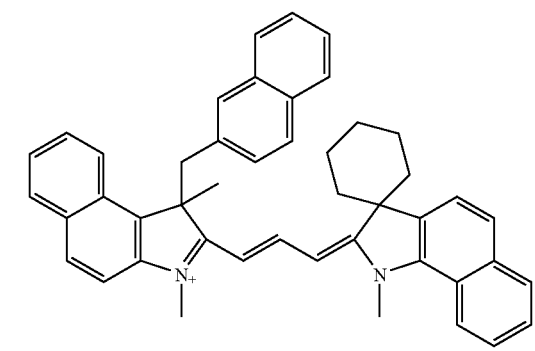
-continued
Compound No. 39
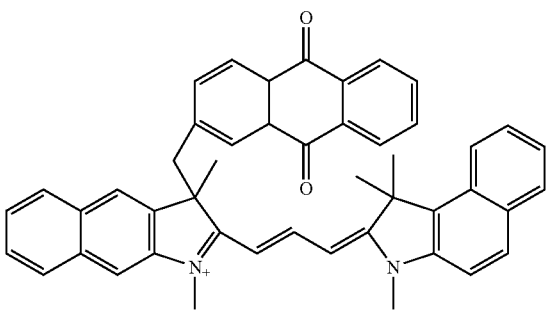
Compound No. 40
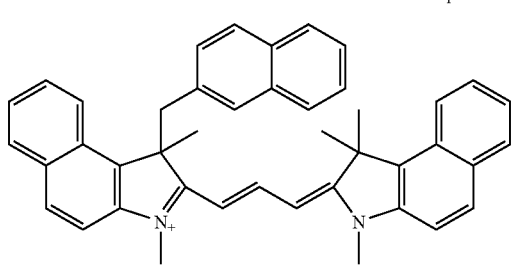
Compound No. 41
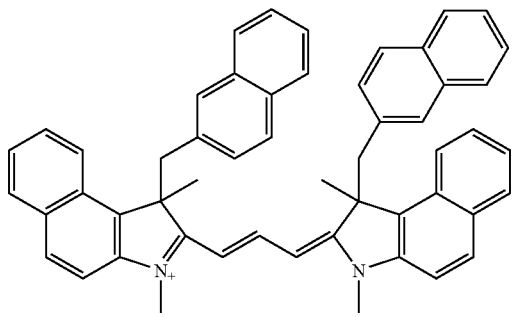
Compound No. 42
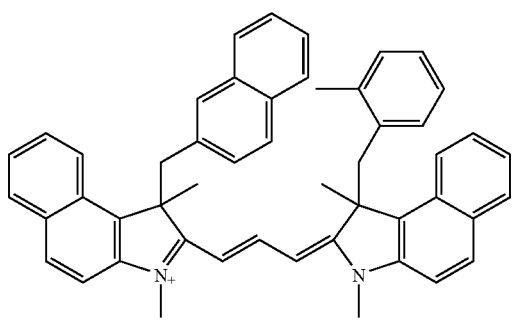
Compound No. 43
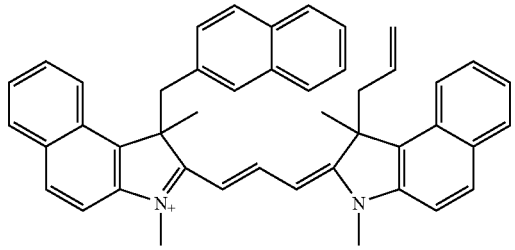

-continued
Compound No. 44
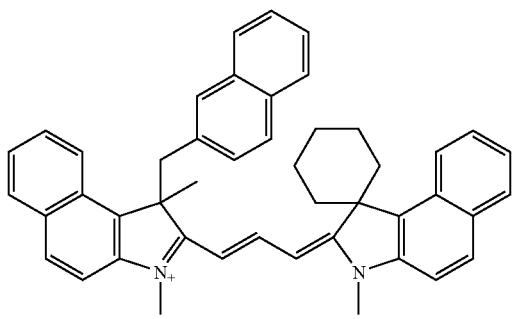
Compound No. 45
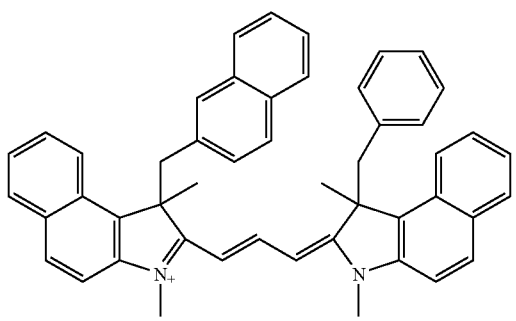
Compound No. 46
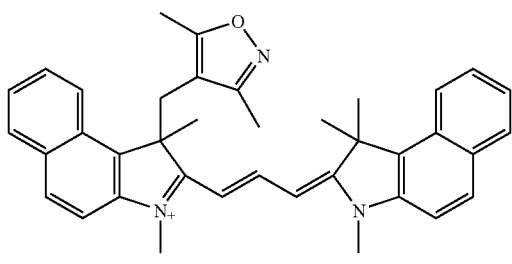
Compound No. 47
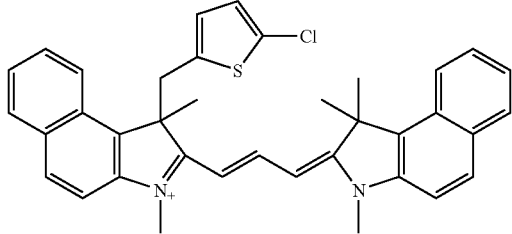
Compound No. 48
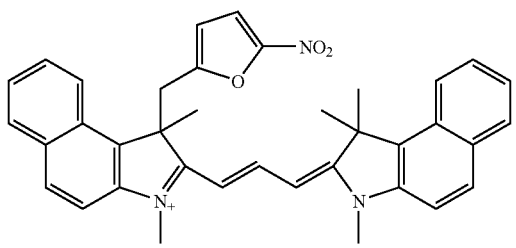
-continued
Compound No. 49
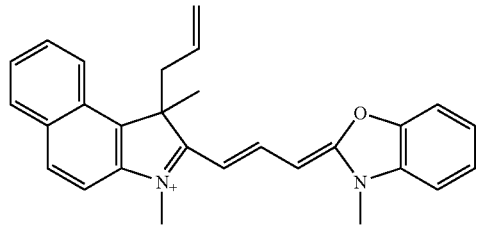
Compound No. 50
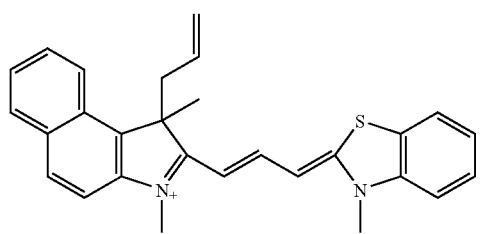
Compound No. 51
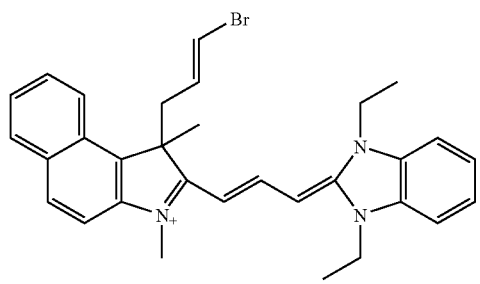
Compound No. 52
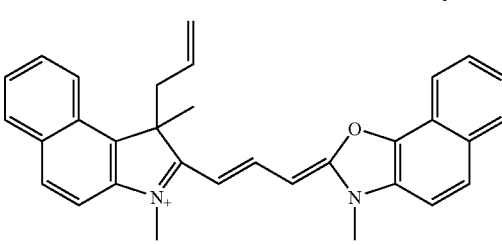
Compound No. 53
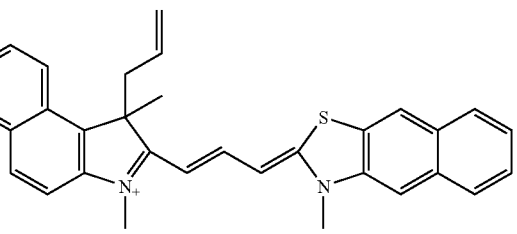
Compound No. 54
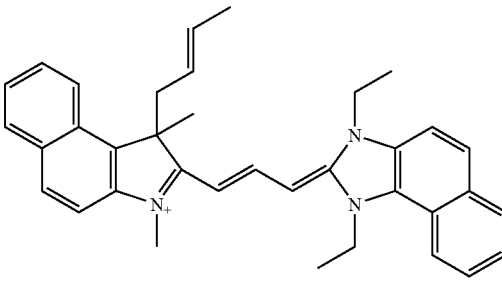

-continued
Compound No. 55
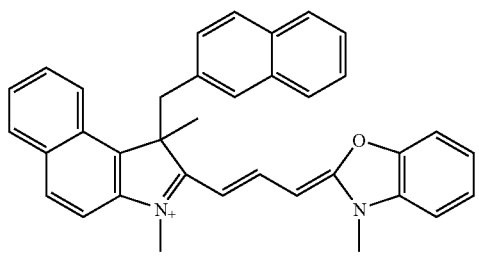
Compound No. 56
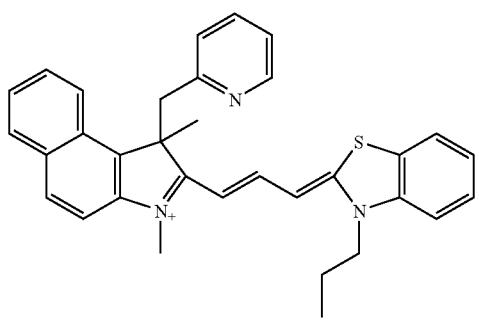
Compound No. 57
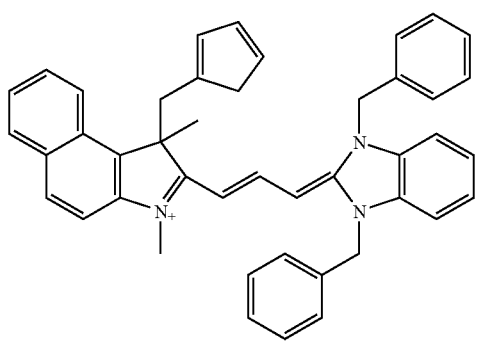
Compound No. 58
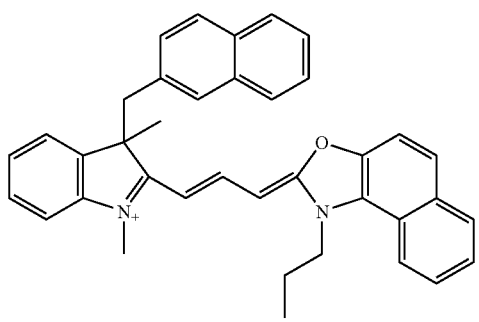
Compound No. 59
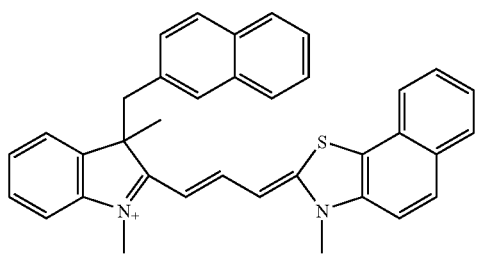
-continued
Compound No. 60
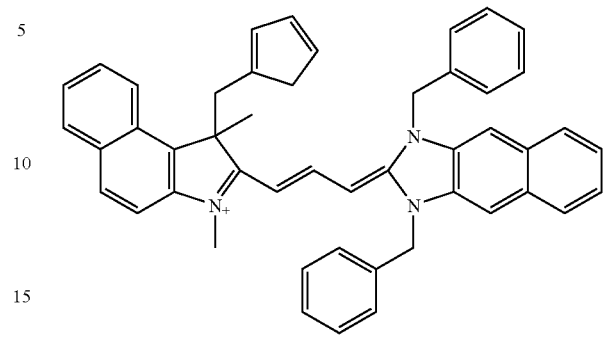
Compound No. 61
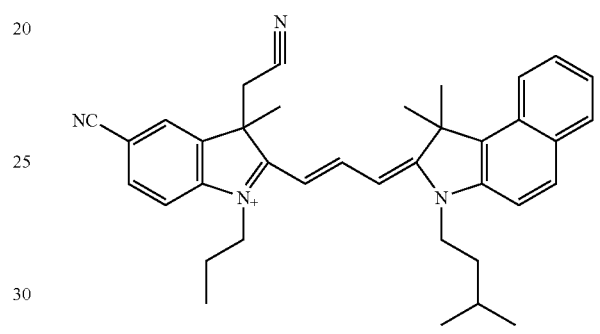
Compound No. 62
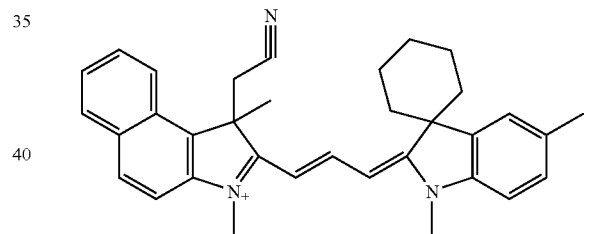
Compound No. 63
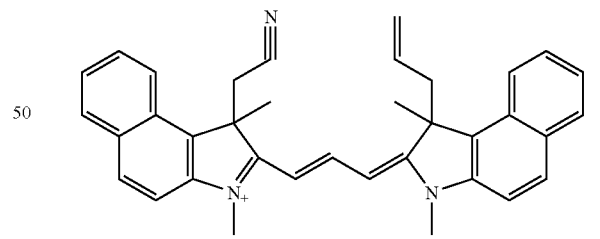
Compound No. 64
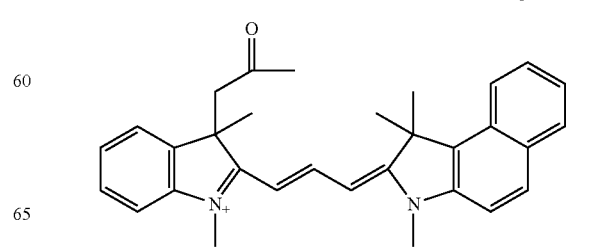

Compound No. 65

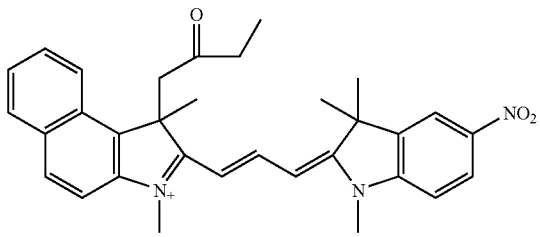

Compound No. 66

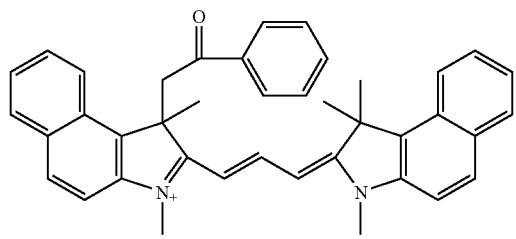

Compound No. 67

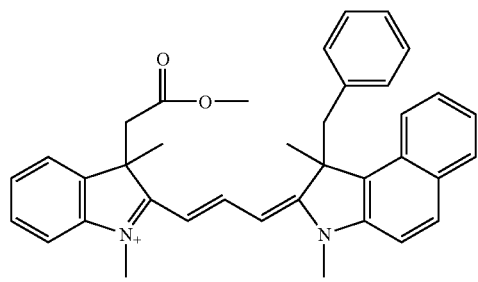

Compound No. 68

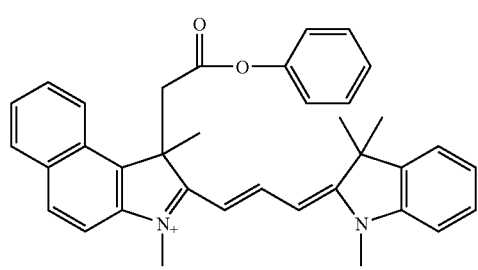

Compound No. 69

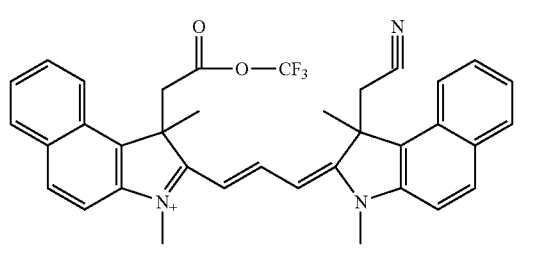

Compound No. 70

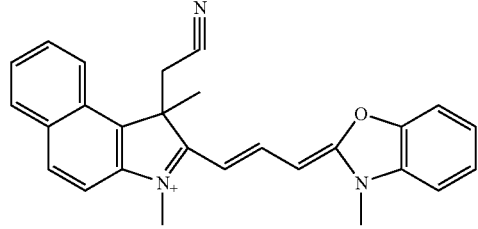

Compound No. 71

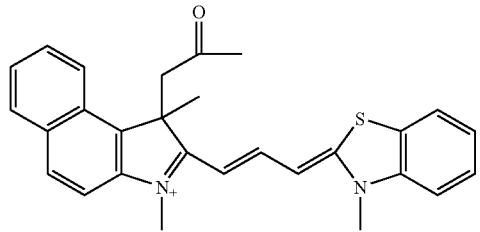

Compound No. 72

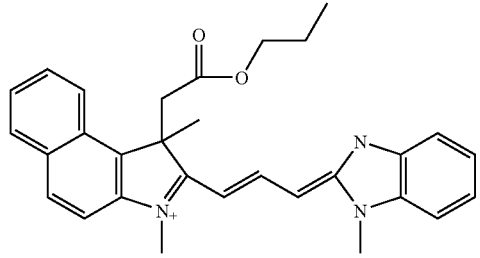

Of the cyanine compounds described above preferred are those of general formula (I) in which X is $CR^3R^4$ (e.g., compound Nos. 1 to 48 and 61 to 69) because of their good light resistance and those in which the ring constructing the indole skeleton to which the group of general formula (II) or (III) is bonded (i.e., the ring A and/or the ring B in the general formula (I)) is a naphthalene ring (e.g., compound Nos. 1 to 12, 19 to 24, 26, 29, 31 to 36, 38 to 57, 60, 62, 63, 65, 66, and 68 to 72) because of their good thermal behavior as an optical recording material, particularly those in which the indole ring has a benzene ring fused to its [e] face (e.g., compound Nos. 1, 4 to 12, 19, 22 to 24, 31, 32, 34, 38, 40 to 57, 60, 62, 63, 65, 66, and 68 to 72).

The cyanine compound of the invention represented by general formula (I) is not restricted by the process of preparation. The cyanine compound is obtainable by, for example, linking two intermediate compounds, 2-methylindole quaternary salt derivatives, using a bridging agent, such as N,N'-diphenylformamidine. The group having a multiple bond represented by general formula (II) or (III) can be introduced in the course of preparing the 2-methylindole quaternary salt derivative. For example, an arylhydrazine derivative as a staring material is allowed to react with a 2-butanone derivative having the multiple bond group of general formula (II) or (III) to form an indole ring, or a halogenated derivative is allowed to react on an indole ring. Y, $Y^1$, and $Y^2$ can be introduced by using Y-D, $Y^1$-D, and $Y^2$-D, respectively (wherein D is a halogen group, e.g., chlorine, bromine or iodine, or a sulfonyloxy group, e.g., phenylsulfonyloxy, 4-methylphenylsulfonyloxy or 4-chlorophenylsulfonyloxy) reactive with NH of an arylamine derivative or an indole ring. The 2-butanone derivative having the multiple bond group represented by general formula (II) or (III) can be obtained by the reaction between acetone and benzaldehyde having a corresponding substituent.

The "optical recording material" according to the present invention includes the cyanine compound represented by general formula (I) per se and a mixture of the cyanine compound and an organic solvent and/or other compounds hereinafter described. The optical recording medium according to the invention has a substrate and an optical recording layer formed on the substrate in a thin film form using the optical recording material of the invention.

The method of forming an optical recording layer of an optical recording media using the optical recording material of the invention is not particularly limited. A wet coating technique is generally used, in which a solution of the cyanine compound and, if necessary, various compounds described later in an organic solvent, is applied to a substrate by spin coating, spray coating, dipping or a like method. Examples of the organic solvent include lower alcohols, such as methanol and ethanol; ether alcohols, such as methyl cellosolve, ethyl cellosolve, butyl cellosolve, and butyl diglycol; ketones, such as acetone, methyl ethyl ketone, methyl isobutyl ketone, cyclohexanone, and diacetone alcohol; esters, such as ethyl acetate, butyl acetate, and methoxyethyl acetate; acrylic esters, such as ethyl acrylate and butyl acrylate; fluoroalcohols, such as 2,2,2-trifluoroethanol, perfluoroethanol, 2,2,3,3-tetrafluoro-1-propanol, and perfluoropropanol; hydrocarbons, such as benzene, toluene, and xylene; and chlorinated hydrocarbons, such as methylene dichloride, dichloroethane, and chloroform. The optical recording layer may also be formed by vacuum evaporation, sputtering or a like technique.

The thickness of the optical recording layer is usually 0.001 to 10 μm, preferably 0.01 to 5 μm.

When the optical recording material of the invention is used to form an optical recording layer of an optical recording medium, the content of the cyanine compound of the general formula a) in the optical recording layer is preferably 25% to 100% by mass. Accordingly, the optical recording material of the invention preferably contains 25% to 100% by mass of the cyanine compound of the general formula (I) on a solid basis to give the above-recited cyanine compound content in the optical recording layer.

Where necessary, the optical recording layer may contain color compounds commonly employed in an optical recording layer, such as cyanine compounds other than those of the invention, azo compounds, phthalocyanine compounds, oxonol compounds, squarylium compounds, styryl compounds, and porphin compounds, in addition to the cyanine compound of general formula (I). The optical recording layer may further contain resins, such as polyethylene, polyester, polystyrene, and polycarbonate; surface active agents; antistatic agents; lubricants; flame retardants; radical scavengers, e.g., hindered amines; pit formation accelerators, e.g., ferrocene derivatives; dispersants; antioxidants; crosslinking agents; light resistance imparting agents; and so forth. The optical recording layer may furthermore contain an aromatic nitroso compound, an aluminum compound, an iminium compound, a bisiminium compound, a transition metal chelate compound, and the like as a quencher for singlet oxygen, etc. These various compounds are preferably used in the optical recording layer in an amount of up to 75% by mass. Accordingly, the content of these compounds in the optical recording material of the invention is preferably up to 75% by mass on a solid basis.

Materials of the substrate on which the optical recording layer is provided is not particularly limited as long as it is substantially transparent to writing (recording) light and reading (reproducing) light and include resins, such as polymethyl methacrylate, polyethylene terephthalate, and polycarbonate, and glass. The substrate can have an arbitrary form, including a tape, a drum, a belt, and a disk.

A reflective layer of gold, silver, aluminum, copper, etc. may be formed on the optical recording layer by vacuum evaporation or sputtering. A protective layer of an acrylic resin, an ultraviolet cured resin, etc. may be provided on the optical recording layer.

The optical recording material of the invention is suitable to optical recording media using a semiconductor laser for writing and reading, especially high-speed recording type optical disks such as DVD-Rs.

EXAMPLES

The present invention will now be illustrated in greater detail with reference to Examples and Evaluation Example, but it should be understood that the invention is not construed as being limited thereto.

Examples 1 to 7 show working examples of the optical recording material of the present invention. In Evaluation Example, the optical recording materials of the invention prepared in Examples and the optical recording materials containing comparative compounds were evaluated for high speed recording performance.

Example 1

Preparation of Hexafluorophosphate of Compound No. 4

In a reaction flask were put 0.050 mol of 1,2,3-trimethylbenzindole, 0.090 mol of 3-bromopentene, and 16.5 g of ethanol and allowed to react at 62° C. for 10 hours. The reaction mixture was cooled to room temperature, and 40 ml of ethyl acetate was slowly added thereto. The crystals thus precipitated were collected by filtration and dried in vacuo at 80° C. for 2 hours to give an intermediate, 1,2,3-trimethyl-3-propenylbenzindolenium bromide, as white crystals in a yield of 70.9%.

In a reaction flask were put 0.008 mol of indole derivative A represented by formula shown below, 0.16 mol of pyridine, and 0.024 mol of acetic anhydride and stirred until the mixture became uniform. To the mixture was added 0.008 mol of the intermediate obtained above (1,2,3-trimethyl-3-propenylbenzindolenium bromide), followed by stirring at room temperature for 17 hours. Fifty grams of chloroform and a solution of 0.024 mol of potassium hexafluorophosphate in 50 g of water were added to the reaction mixture, followed by stirring at 50° C. for 30 minutes to effect salt exchange. The aqueous phase was discarded, and a solution of 0.012 mol of potassium hexafluorophosphate in 50 g of water was added to the organic phase, followed by stirring at 50° C. for 30 minutes. The aqueous phase was discharged, and a solution of 0.012 mol of potassium hexafluorophosphate in 50 g of water was added, followed by stirring at 50° C. for 30 minutes to complete salt exchange. The aqueous phase was removed, and the residual organic phase was washed with four 50 g portions of water and concentrated to give a residue. While heating the residue, 100 g of methanol was added thereto to conduct crystallization. The crystals were collected by filtration, washed successively with methanol, 60° C. water, and methanol, and dried in vacuo at 110° C. for 2 hours to give green crystals in a yield of 43.1%. As a result of analyses, the resulting green crystals were identified to be the title compound, hexafluorophosphate of compound No. 4. The results of the analyses are shown below.

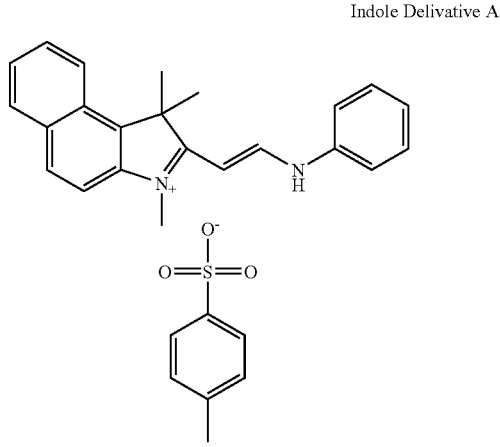

Indole Delivative A

Optical characteristics (chloroform; 4.13×10⁻⁶ mol/l): $\lambda_{max}$=598 nm; $\epsilon$=1.20×10⁵

Molecular weight (TOF-mass spectrum): 628.6

¹H-NMR (DMSO): FIG. 1

Example 2

Preparation of Hexafluorophosphate of Compound No. 5

In a reaction flask were put 0.02 mol of the intermediate prepared in the same manner as in Example 1 (i.e., 1,2,3-trimethyl-3-propenylbenzindolenium bromide), 0.01 mol of N,N'-diphenylamidine, 0.2 mol of pyridine, and 0.03 mol of acetic anhydride and stirred at 50° C. for 10 hours. To the reaction mixture were added 15.8 g of chloroform, 55 g of water, and 0.03 mol of potassium hexafluorophosphate, followed by stirring at 50° C. for 0.5 hours to effect salt exchange. The aqueous phase was discarded, and a solution of 0.014 mol of potassium hexafluorophosphate in 50 g of water was again added to the organic phase, followed by stirring at 50° C. for 0.5 hours to complete salt exchange. The aqueous phase was removed, and the residual organic phase was washed with three 50 g portions of water and concentrated to give a residue. While heating the residue, 15.8 g of methanol was added thereto to conduct crystallization. The crystals were collected by filtration, washed successively with methanol and 60° C. water, and dried in vacuo at 120° C. for 3 hours to give green crystals in a yield of 58.0%. As a result of analyses, the resulting green crystals were identified to be the title compound, hexafluorophosphate of compound No. 5. The results of the analyses are shown below.

Optical characteristics (chloroform; 6.11×10⁻⁶ mol/l): $\lambda_{max}$=601.5 nm; $\epsilon$=1.24×10⁵

Molecular weight (TOF-mass spectrum): 654.7

¹H-NMR (DMSO): FIG. 2

Example 3

Preparation of Hexafluorophosphate of Compound No. 14

In a reaction flask were put 0.050 mol of 1,2,3-trimethylindole, 0.058 mol of 2-bromocyclohexene, and 16.0 g of ethanol and caused to react at room temperature for 21 hours. The reaction mixture was concentrated, and 30 ml of acetone was slowly added to the residue. The crystals thus precipitated were collected by filtration and dried in vacuo at 80° C. for 2.5 hours to afford an intermediate, 1,2,3-trimethyl-3-cyclohexenylindolenium bromide, as white crystals in a yield of 47.2%.

In a reaction flask were put 0.005 mol of indole derivative A, 0.05 mol of pyridine, and 0.007 mol of acetic anhydride and stirred until the mixture became uniform. To the mixture was added 0.005 mol of the intermediate obtained above (1,2,3-trimethyl-3-cyclohexenylindolenium bromide), followed by stirring at 50° C. for 1 hour. Eight grams of chloroform was added to the reaction mixture, and the resulting organic solution was washed with 8 g of water. A solution of 0.0075 mol of potassium hexafluorophosphate in 8 g of water was added thereto, followed by stirring at 50° C. for 0.5 hours to effect salt exchange. The aqueous phase was discarded, and a solution of 0.0005 mol of potassium hexafluorophosphate in 8 g of water was added to the organic phase, followed by stirring at 50° C. for 0.5 hours to complete salt exchange. The aqueous phase was removed, and the residual organic phase was washed with two 8 g portions of water and concentrated. The resulting residue was dissolved in 4 g of pyridine while hot, and 8 g of methanol was added thereto to conduct crystallization. The crystals collected by filtration were again dissolved in pyridine while hot and recrystallized from methanol and dried in vacuo at 140° C. for 2 hours to give green crystals in a yield of 27.8%. As a result of analyses, the resulting green crystals were identified to be the title compound, hexafluorophosphate of compound No. 14. The results of the analyses are shown below.

Optical characteristics (chloroform; 1.22×10⁻⁵ mol/l): $\lambda_{max}$=578 nm; $\epsilon$=1.26×10⁵

Molecular weight (TOF-mass spectrum): 618.7

¹H-NMR (DMSO): FIG. 3

Example 4

Preparation of Hexafluorophosphate of Compound No. 19

In a reaction flask were put 0.150 mol of 1,2,3-trimethylbenzindole, 0.195 mol of 4-bromo-2-butene, and 103 g of ethanol and allowed to react at 48° C. for 2 hours. The reaction mixture was concentrated. The residue was dissolved in 10 ml of methanol, and 100 g of ethyl acetate was added thereto to precipitate crude crystals, which were collected by filtration and dissolved in 19 g of methanol and recrystallized by the addition of 50 g of ethyl acetate. The crystals were dried in vacuo at 80° C. for 2.5 hours to give an intermediate, 1,2,3-trimethyl-3-butenylbenzindolenium bromide, as white crystals in a yield of 34.1%.

In a reaction flask were put 0.0094 mol of indole derivative B represented by formula shown below, 0.1 mol of pyridine, and 0.014 mol of acetic anhydride and stirred until the mixture became uniform. To the mixture was added 0.01 mol of the intermediate obtained above (1,2,3-trimethyl-3-butenylbenzindolenium bromide), followed by stirring at 40° C. for 2.5 hours. Ten grams of chloroform was added to the reaction mixture, and the resulting organic solution was washed with 10 g of water. A solution of 0.0025 mol of potassium hexafluorophosphate in 10 g of water was added to the solution followed by stifling at 40° C. for 0.5 hours to effect salt exchange. The aqueous phase was discarded, and the organic phase was again washed with two 10 g portions of water and concentrated to give a residue. The residue was heated, and 16 g of ethyl acetate was added thereto to conduct crystallization. The crystals were collected by filtration and dried in vacuo at 120° C. for 2 hours to give green crystals in a yield of 48.8%. As a result of analyses, the resulting green crystals were identified to be the title compound, hexafluorophosphate of compound No. 19. The results of the analyses are shown below.

Indole Derivative B

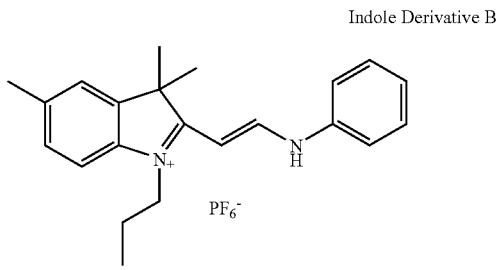

Optical characteristics (chloroform; $7.64 \times 10^{-6}$ mol/l): $\lambda_{max}$=583 nm; $\epsilon$=1.34×10$^5$ Molecular weight (TOF-mass spectrum): 634.7

$^1$H-NMR (DMSO): FIG. 4

Example 5

Preparation of Hexafluorophosphate of Compound No. 40

In a reaction flask were put 0.080 mol of 1,2,3-trimethylbenzindole, 0.080 mol of bromomethylnaphthalene, and 68.9 g of ethanol and caused to react at 30° C. for 3 hours. The reaction mixture was filtered, and the filtrate was concentrated. The residue was dissolved in 10 ml of methanol while hot, and 50 g of ethyl acetate was added thereto to precipitate crude crystals. The crude crystals were dissolved in 83 g of methanol, the solution heated, and 62 g of ethyl acetate added to perform crystallization. The resulting crude crystals were again recrystallized using methanol and ethyl acetate in the same manner as above. The crystals were dried in vacuo at 80° C. for 2 hours to furnish an intermediate, 1,2,3-trimethyl-3-naphthylmethylbenzindolenium bromide, as white crystals in a yield of 35.8%.

In a reaction flask were put 0.004 mol of indole derivative B, 0.08 mol of pyridine, and 0.0056 mol of acetic anhydride and stirred at 50° C. until the mixture became uniform. To the mixture was added 0.004 mol of the intermediate obtained above (1,2,3-trimethyl-3-naphthylmethylbenzindolenium bromide), followed by stirring at 50° C. for 2 hours. To the reaction mixture was added 6.3 g of chloroform, and the resulting organic solution was washed with 12.6 g of water. A solution of 0.012 mol of potassium hexafluorophosphate in 15 g of water was added to the solution, followed by stirring at 50° C. for 1.5 hours to effect salt exchange. The reaction mixture was filtered, and the collected crystals were dried in vacuo at 180° C. for 2 hours to give green crystals in a yield of 51.7%. As a result of analyses, the resulting green crystals were identified to be the title compound, hexafluorophosphate of compound No. 40. The results of the analyses are shown below.

Optical characteristics (chloroform; $4.09 \times 10^{-6}$ mol/l): $\lambda_{max}$=602 nm; $\epsilon$=1.21×10$^5$ Molecular weight (TOF-mass spectrum): 728.8

$^1$H-NMR (DMSO): FIG. 5

Example 6

Preparation of Hexafluorophosphate of Compound No. 41

In a reaction flask were put 0.01 mol of 1,2,3-trimethyl-3-naphthylmethylbenzindolenium bromide obtained in the same manner as in Example 5, 0.006 mol of N,N'-diphenylamidine, and 0.10 mol of pyridine and stirred at 90° C. for 4 hours. After cooling to room temperature, 0.014 mol of acetic anhydride was added to the reaction mixture, followed by stirring at 60° C. for 2 hours. To the reaction mixture were added 8.0 g of chloroform, 16 g of water, and 0.02 mol of potassium hexafluorophosphate, followed by stirring at 50° C. for 0.5 hours to cause salt exchange. The aqueous phase was discarded, and a solution of 0.005 mol of potassium hexafluorophosphate in 16 g of water was added to the organic phase, followed by stirring at 50° C. for 0.5 hours to complete salt exchange. The aqueous phase was discharged, and the organic phase was washed with two 16 g portions of water and concentrated. The residue was dissolved in 8 g of pyridine while hot, and 16 g of methanol was added thereto to precipitate crystals, which were collected by filtration and dissolved in pyridine while hot and recrystallized from methanol. The crystals were further recrystallized from a mixture of 5 g of pyridine and 2.5 g of water and dried in vacuo at 175° C. for 2 hours to give green crystals in a yield of 10.5%. As a result of analyses, the resulting green crystals were identified to be the title compound, hexafluorophosphate of compound No. 41. The results of the analyses are shown below.

Optical characteristics (chloroform; $4.68 \times 10^{-6}$ mol/l): $\lambda_{max}$=609 nm; $\epsilon$=1.22×10$^{-5}$ Molecular weight (TOF-mass spectrum): 854.9

$^1$H-NMR (DMSO): FIG. 6

Example 7

Preparation of Hexafluorophosphate of Compound No. 48

In a reaction flask were put 0.020 mol of 1,2,3-trimethylbenzindole, 0.020 mol of 2-nitro-5-bromomethylfuran, and 17.2 g of ethanol and caused to react at 60° C. for 5 hours. The reaction mixture was concentrated, and 32 g of butyl acetate was added to the residue, and the mixture was heated to 70° C., followed by cooling. The crystals thus precipitated were collected by filtration and dried in vacuo at 120° C. for 2 hours to give an intermediate, 1,2,3-trimethyl-3-(5-nitrofuran-2-ylmethyl)benzindolenium bromide, as pale yellow crystals in a yield of 76.7%.

In a reaction flask were put 0.005 mol of indole derivative A, 0.10 mol of pyridine, and 0.007 mol of acetic anhydride and stirred at 45° C. until the mixture became uniform. To the mixture was added 0.005 mol of the intermediate obtained above, followed by stirring at 45° C. for 4 hours. Eight grams of chloroform was added to the reaction mixture, and the resulting organic solution was washed with 15 g of water, and a solution of 0.015 mol of potassium hexafluorophosphate in 15 g of water was added thereto, followed by stirring at 45° C. for 0.5 hours to effect salt exchange. The aqueous phase was discarded, and a solution of 0.005 mol of potassium hexafluorophosphate in 15 g of water was again added to the organic phase, followed by stirring at 45° C. for 0.5 hours to complete salt exchange. The aqueous phase was removed, and the residual organic phase was washed with two 15 g portions of water and concentrated. The resulting residue was crystallized from 10 g of methanol. The resulting crude crystals were dissolved in 24 g of pyridine while hot and 8 g of water was added. The precipitated solid phase was separated by filtration. The filtrate was concentrated. The residue was dissolved in 5 g of pyridine while hot, and 5 g of methanol was added to cause crystallization. The crystals were collected by filtration were dried in vacuo at 120° C. for 2.5 hours to give purple crystals in a yield of 1.4%. As a result of analyses, the resulting purple crystals were identified to be the title compound, hexafluorophosphate of compound No. 48. The results of the analyses are shown below.

Optical characteristics (chloroform; $5.68 \times 10^{-6}$ mol/l): $\lambda_{max} = 600.5$ nm; $\epsilon = 1.05 \times 10^5$ Molecular weight (TOF-mass spectrum): 713.7

$^1$H-NMR (DMSO): FIG. 7

Evaluation Example

Some of the cyanine compounds obtained in the foregoing Examples and comparative compounds 1 to 3 shown below were subjected to differential thermal analysis in a nitrogen stream to measure heat decomposition temperature. The heat decomposition temperature was expressed by the exothermic peak top temperature of DTA at a temperature rise of 10° C./min in nitrogen. The results are shown in Table 1.

TABLE 1

| Cyanine Compound | | Heat Decomposition |
| --- | --- | --- |
| Example No. | Cation | Anion | Temperature (° C.) |
| 2 | compound No. 5 | $PF_6^-$ | 198.9 |
| 3 | compound No. 14 | $PF_6^-$ | 200.2 |
| 4 | compound No. 19 | $PF_6^-$ | 204.6 |
| 5 | compound No. 40 | $PF_6^-$ | 215.3 |
| 7 | compound No. 48 | $PF_6^-$ | 203.6 |
| — | comparative compound 1 (anion: $PF_6^-$) | | 282.5 |
| — | comparative compound 2 (anion: $PF_6^-$) | | 292.0 |
| — | comparative compound 3 (anion: $PF_6^-$) | | 227.1 |

Comparative Compound 1

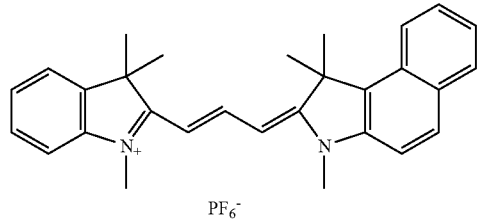

$PF_6^-$

Comparative Compound 2

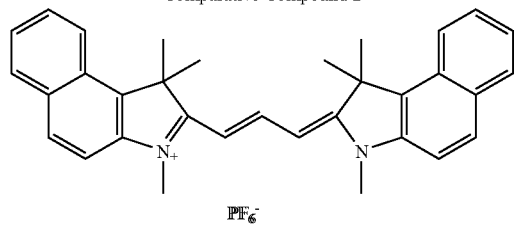

$PF_6^-$

TABLE 1-continued

| Cyanine Compound | | Heat Decomposition |
| --- | --- | --- |
| Example No. | Cation | Anion | Temperature (° C.) |

Comparative Compound 3

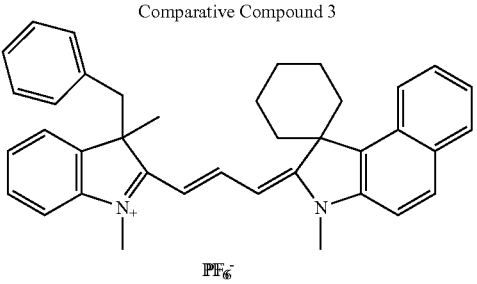

$PF_6^-$

It is confirmed from the results in Table 1 that the cyanine compounds of the invention represented by general formula (I) have low heat decomposition temperatures. This indicates that the optical recording material of the invention which contains the cyanine compound of general formula (I) is suitable for high-speed recording.

Optical recording media were fabricated by forming a thin film on a substrate using each of the compounds prepared in Examples. As a result all the optical recording materials were proved capable of high-speed recording compared with conventional optical recording media.

INDUSTRIAL APPLICABILITY

The present invention provides an optical recording material and an optical recording medium that exhibit performance properties suited to high-speed optical recording applications.

The invention claimed is:

1. An optical recording medium comprising an optical recording layer together with a reflective layer or a UV cured protective layer provided on a substrate, the optical recording layer comprising a cyanine compound having a decomposition temperature of 215.3° C. or less and represented by general formula (I)

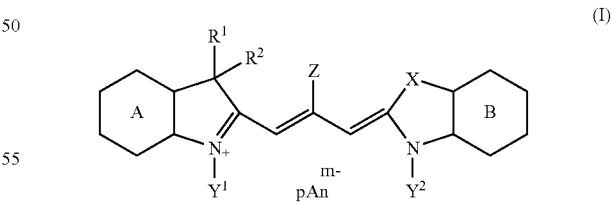

(I)

wherein ring A and ring B each represent a benzene ring optionally having a substituent or a naphthalene ring optionally having a substituent; X represents O, S, Se, $CR^3R^4$ or NY; one of $R^1$ and $R^2$ represents a group represented by general formula (II) or (III) below, with the other representing an organic group having 1 to 30 carbon atoms; $R^3$ and $R^4$ each represent an organic group having 1 to 30 carbon atoms; Y, $Y^1$, and $Y^2$ each represent a hydrogen atom or an organic group having 1 to 30 carbon atoms; Z

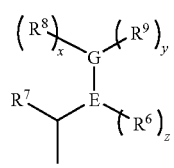

represents a hydrogen atom, a halogen atom or a cyano group; $An^{m-}$ represents an m-valent anion; m represents an integer of 1 or 2; and p represents a coefficient maintaining charge neutrality, wherein the bond between E and G is a double bond or a triple bond; E represents a carbon atom; G represents a carbon atom, an oxygen atom or a nitrogen atom; x, y, and z each independently represent 0 or 1; $R^5$ represents a hydrogen atom, a halogen atom, an alkyl group having 1 to 4 carbon atoms and optionally substituted with a halogen atom or an alkoxy group having 1 to 4 carbon atoms and optionally substituted with a halogen atom; $R^6$, $R^7$, and $R^8$ each independently represent a hydrogen atom, a halogen atom or an alkyl group having 1 to 4 carbon atoms and optionally substituted with a halogen atom; $R^6$ and $R^8$ may be connected to each other to form a cyclic structure

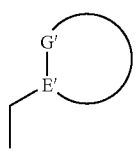

wherein the bond between E' and G' is a double bond; E' represents a carbon atom; G' represents a carbon atom, an oxygen atom or a nitrogen atom; the ring containing E' and G' is a 5-membered ring optionally containing a hetero atom, a heterocyclic 6-membered ring, a naphthalene ring, a quinoline ring, an isoquinoline ring, an anthracene ring or an anthraquinone ring; the ring containing E' and G' may be substituted with at least one substituent selected from the group consisting of a halogen atom, a nitro group, a cyano group, an alkyl group, and an alkoxy group.

2. The optical recording material according to claim 1, wherein one of $R^1$ and $R^2$ represents a group represented by general formula (II) or (III) with the other representing a group represented by general formula (II), a group represented by general formula (III), an alkyl group having 1 to 4 carbon atoms, a benzyl group or a substituted benzyl group; and $R^3$ and $R^4$ each represent a group represented by general formula (II), a group represented by general formula (III), an alkyl group, a benzyl group or a substituted benzyl group, or $R^3$ and $R^4$ are taken together to represent a group forming a 3 to 6 membered ring.

3. The optical recording medium according to claim 1, wherein X is $CR^3R^4$.

4. The optical recording medium according to claim 1, wherein $R^1$ is an allyl group; $R^2$ is a methyl group; X is $CR^3R^4$; and $R^3$ and $R^4$ are each a methyl group.

5. The optical recording medium according to claim 1, wherein $R^1$ is an allyl group; $R^2$ is a methyl group; X is $CR^3R^4$; $R^3$ is a methyl group; and $R^4$ is an allyl group.

6. The optical recording medium according to claim 1, wherein $R^1$ is a 2-butenyl group; $R^2$ is a methyl group; X is $CR^3R^4$; and $R^3$ and $R^4$ are each a methyl group.

7. The optical recording medium according to claim 1, wherein $R^1$ is a cyclic structure represented by general formula (III) that is an oxygen-containing 5-membered ring substituted with a nitro group; $R^2$ is a methyl group; X is $CR^3R^4$; and $R^3$ and $R^4$ are each a methyl group.

8. The optical recording medium according to claim 1, wherein $R^1$ is a structure represented by general formula (II) in which the bond between G and E is a double bond; $R^5$ and $R^7$ are each a hydrogen atom; and $R^6$ and $R^8$ are taken together to form a 6-membered ring; $R^2$ is a methyl group; X is $CR^3R^4$; and $R^3$ and $R^4$ are each a methyl group.

9. The optical recording medium according to claim 1, wherein $R^1$ is a cyclic structure represented by general formula (III) in which the ring containing the double bond formed by E'-G' is a naphthalene ring; $R^2$ is a methyl group; X is $CR^3R^4$; and $R^3$ and $R^4$ are each a methyl group.

10. The optical recording medium according to claim 2, wherein X is $CR^3R^4$.

* * * * *